United States Patent

Manning

[15] 3,671,606

[45] *June 20, 1972

[54] OXIDATIVE DEHYDROGENATION UTILIZING MANGANESE FERRITE

[72] Inventor: Harold E. Manning, Houston, Tex.

[73] Assignee: Petro-Tex Chemical Corporation, Houston, Tex.

[ * ] Notice: The portion of the term of this patent subsequent to Jan. 7, 1986, has been disclaimed.

[22] Filed: Oct. 2, 1969

[21] Appl. No.: 863,380

Related U.S. Application Data

[63] Continuation-in-part of Ser. No. 671,237, Sept. 28, 1967, abandoned.

[52] U.S. Cl. .................... 260/680 E, 23/DIG. 1, 260/669 R, 260/683.3

[51] Int. Cl. .......................................................... C07c 5/18

[58] Field of Search ..................... 260/680 E, 683.3

[56] References Cited

UNITED STATES PATENTS

| | | | |
|---|---|---|---|
| 3,420,912 | 1/1969 | Woskow et al. | 260/680 |
| 3,526,675 | 9/1970 | Croce et al. | 260/680 |
| 2,706,741 | 4/1955 | Sieg et al. | 260/680 X |
| 3,284,536 | 11/1966 | Bajars et al. | 260/680 X |

*Primary Examiner*—Paul M. Coughlan, Jr.
*Attorney*—G. Baxter Dunaway

[57] ABSTRACT

Oxidative dehydrogenation of organic compounds in vapor phase utilizing manganese ferrite which has been prepared by heating precipitates which are the precursors of manganese ferrite.

6 Claims, No Drawings

OXIDATIVE DEHYDROGENATION UTILIZING MANGANESE FERRITE

CROSS-REFERENCE TO OTHER APPLICATIONS

This application is a continuation-in-part of my pending U. S. Pat. application Ser. No. 671,237, filed Sept. 28, 1967 now abandoned.

BACKGROUND OF THE INVENTION

1. Field of the Invention

This application relates to the oxidative dehydrogenation of organic compounds in the presence of manganese ferrite which has been prepared by a particular manner. The invention is particularly suitable for the dehydrogenation of hydrocarbons and preferred products are such as olefins or diolefins.

2. Description of the Prior Art

It is known to dehydrogenate organic compounds by contacting the compound to be dehydrogenated at an elevated temperature preferably in the presence of catalysts. One method of dehydrogenation is known as oxidative dehydrogenation. According to this process, hydrogen released from the organic compounds reacts with oxygen to form water. One of the principal defects in oxidative dehydrogenation reactions is that quite often the reactions are unselective and oxygenated compounds are formed instead of the desired dehydrogenated compounds. These non-selective reactions are particularly evident when the compound to be dehydrogenated contains three or more carbon atoms. For example, when methyl butene is reacted with oxygen, a variety of products other than isoprene are possible as hydrocarbons and oxygenated hydrocarbons of various general mixtures may result. Also, combustion of the hydrocarbon may result in the formation of CO, $CO_2$ and water. It is therefore one of the principal objectives of this invention to provide a process wherein the organic compound is dehydrogenated preferably to a product having the same number of carbon atoms at a high level of conversion and selectivity. Another principal objective is to provide a process wherein the catalyst has long catalyst life. Other objectives of this invention are to provide a process wherein it is possible to have substantial quantities of steam present in the dehydrogenation zone, a high over-all throughput and a low contact time in the dehydrogenation zone, a process wherein the catalyst is not easily disintegrated, a low maximum temperature during dehydrogenation and a process which has good control of reaction temperature. These and other objectives may be achieved by the process of this invention.

SUMMARY OF THE INVENTION

Organic compounds are dehydrogenated by a process of oxidative dehydrogenation utilizing manganese ferrite in the dehydrogenation zone. The manganese ferrite has been prepared by reacting by heating precipitates of compounds which are the precursors of manganese ferrite.

DESCRIPTION OF THE PREFERRED EMBODIMENT(S)

The process of this invention may be applied to the dehydrogenation of a great variety of organic compounds to obtain the corresponding unsaturated derivative thereof. Such compounds normally will contain from 2 to 20 carbon atoms, at least one

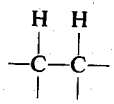

grouping, a boiling point below about 350° C., and such compounds may contain other elements, in addition to carbon and hydrogen such as oxygen, halogens, nitrogen and sulphur. Preferred are compounds having from two to 12 carbon atoms, and especially preferred are compounds of two to six or eight carbon atoms.

Among the types of organic compounds which may be successfully dehydrogenated to the corresponding unsaturated derivative by means of the novel process of this invention are nitriles, amines, alkyl halides, ethers, esters, aldehydes, ketones, alcohols, acids, alkyl aromatic compounds, alkyl heterocyclic compounds, cycloalkanes, alkanes, alkenes, and the like. Illustration of dehydrogenations include propionitrile to acrylonitrile, propionaldehyde to acrolein, ethyl chloride to vinyl chloride, methyl isobutyrate to methyl methacrylate, 2 or 3 chlorobutene-1 or 2, 3 dichlorobutane to chloroprene, ethyl pyridine to vinyl pyridine, ethylbenzene to styrene, isopropylbenzene to α-methyl styrene, ethylcyclohexane to styrene, cyclohexane to benzene, ethane to ethylene, propane to propylene, isobutane to isobutylene, n-butane to butene and butadiene-1, 3, butene to butadiene-1, 3 and vinyl acetylene, methyl butene to isoprene, cyclopentane to cyclopentene and cyclopentadiene-1,3 n-octane to ethyl benzene and ortho-xylene, monomethylheptanes to xylenes, propane to propylene to benzene, ethyl acetate to vinyl acetate, 2,4,4-trimethylpentane to xylenes, and the like. This invention may be useful for the formation of new carbon to carbon bonds by the removal of hydrogen atoms such as the formation of a carbocyclic compound from two aliphatic hydrocarbon compounds or the formation of a dicyclic compound from a monocyclic compound having an acyclic group. Examples of conversions are the conversion of n-heptane to toluene and propene to diallyl. Representative materials which are dehydrogenated by the novel process of this invention include ethyl toluene, alkyl chlorobenzenes, ethyl naphthalene, isobutyronitrile, propyl chloride, isobutyl chloride, ethyl fluoride, ethyl bromide, n-pentyl iodide, ethyl dichloride, 2,3 dichlorobutane, 1,3 dichlorobutane, 1,4 dichlorobutane, the chlorofluoroethanes, methyl pentane, methylethyl ketone, diethyl ketone, n-butyl alcohol, methyl propionate, and the like. This invention is particularly adapted to the preparation of vinylidene compounds containing at least one

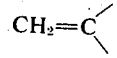

group, that is, a group containing a terminal methylene group attached by a double bond to a carbon atom, and having two to 12 carbon atoms by the dehydrogenation of compounds of the formula $CH_3 - CH_2 - R$ wherein R is an organic radical of from zero to 10 carbon atoms, preferably a hydrocarbon. Similarly, acetylenic compounds of the formula $CH \equiv C -$ may be produced from the same starting materials.

Preferably oxygen is employed, suitably in an amount within the range of 0.2 to about 5.0 mols of oxygen per mol of organic compound to be dehydrogenated, preferably from 0.2 to 2.5 mols per mol. Generally, better results may be obtained if the oxygen concentration is maintained between about 0.25 and about 1.6 mols of oxygen per mol of organic compound to be dehydrogenated, such as between 0.35 and 1.2 mols of oxygen. The oxygen may be fed to the reactor as pure oxygen, as air, as oxygen-enriched air, oxygen mixed with diluents, and so forth. Based on the total gaseous mixture entering the reactor, good results are obtained with oxygen present in an amount from about 0.5 to 25 volume percent of the total gaseous mixture, such as in an amount from about 1 to 15 volume percent of the total. The total amount of oxygen utilized may be introduced into the gaseous mixture entering the catalytic zone or sometimes it has been found desirable to add the oxygen in increments, such as to different sections of the reactor. The above described proportions of oxygen employed are based on the total amount of oxygen used. The oxygen may be added directly to the reactor or it may be premixed, for example, with a diluent or steam. It is also within the scope of this invention to employ the described manganese compositions as the partial or sole source of oxygen used for oxidative dehydrogenation. For example, the manganese compositions may release oxygen to react with the organic compound during a dehydrogenation step and thereafter the manganese composition is regenerated by oxidation prior to another step where oxygen is released. Preferably such a process will have the manganese composition present as a moving bed.

It is one of the advantages of this invention that halogen may also be added to the reaction gases to give excellent results. The addition of halogen to the feed is particularly effective when the hydrocarbon to be dehydrogenated is saturated. The halogen present in the dehydrogenation zone may be either elemental halogen or any compound of halogen which would liberate halogen under the conditions of reaction. Suitable sources of halogen are such as hydrogen iodide, hydrogen bromide and hydrogen chloride; aliphatic halides, such as ethyl iodide, methyl bromide, 1,2-dibromo ethane, ethyl bromide, amyl bromide, and allyl bromide; cycloaliphatic halides, such as cyclohexylbromide; aromatic halides, such as benzyl bromide; halohydrins, such as ethylene bromohydrin; halogen substituted aliphatic acids, such as bromoacetic acid; ammonium iodide; ammonium bromide; ammonium chloride; organic amine halide salts, such as methyl amine hydrobromide; metal halides including molten halides; and the like. Mixtures of various sources of halogen may be used. The preferred sources of halogen are iodine, bromine, and chlorine, and compounds thereof, such as hydrogen bromide, hydrogen iodide, hydrogen chloride, ammonium bromide, ammonium iodide, ammonium chloride, alkyl halides of one to six carbon atoms and mixtures thereof, with the iodine and bromine compounds, especially the ammonium compounds, being particularly preferred. When terms such as halogen liberating materials or halogen materials are used in the specification and claims, this includes any source of halogen such as elemental halogens, hydrogen halides, or ammonium halides. The amount of halogen, calculated as elemental halogen, may be as little as about 0.0001 or less mol of halogen per mol of the organic compound to be dehydrogenated to as high as 0.2 or 0.5. The preferred range is from about 0.001 to 0.09 mol of halogen per mol of the organic compound to be dehydrogenated.

The temperature for the dehydrogenation reaction generally will be at least about 250° C., such as greater than about 300° C. or 375° C., and the maximum temperature in the reactor may be about 650° C. or 750° C. or perhaps higher such as 900° C. under certain circumstances. However, excellent results are obtained within the range of or about 300° C. to 575° C., such as from or about 325° C. to or about 525° C. The temperatures are measured at the maximum temperature in the dehydrogenation zone. An advantage of this invention is that lower temperatures of dehydrogenation may be utilized than are possible in conventional dehydrogenation processes. Another advantage is that large quantities of heat do not have to be added to the reaction.

The dehydrogenation reaction may be carried out at atmospheric pressure, superatmospheric pressure or at sub-atmospheric pressure. The total pressure of the system will normally be about or in excess of atmospheric pressure, although sub-atmospheric pressure may also desirably be used. Generally, the total pressure will be between about 4 p.s.i.a. and about 100 or 125 p.s.i.a. Preferably, the total pressure will be less than about 75 p.s.i.a. and excellent results are obtained at about atmospheric pressure.

The initial partial pressure of the organic compound to be dehydrogenated will preferably be equivalent to equal to or less than one-half atmosphere at a total pressure of one atmosphere. Generally, the combined partial pressure of the organic compound to be dehydrogenated, together with the oxygen in gaseous phase will also be equivalent to less than one-half atmosphere at a total pressure of one atmosphere. Preferably, the initial partial pressure of the organic compound to be dehydrogenated will be equivalent to no greater than one-third atmosphere or no greater than one-fifth atmosphere at a total pressure of one atmosphere. Reference to the initial partial pressure of the organic compound to be dehydrogenated means the partial pressure of the organic compound as it first contacts the catalytic particles. An equivalent partial pressure at a total pressure of one atmosphere means that one atmosphere total pressure is a reference point and does not imply that the total pressure of the reaction must be operated at atmospheric pressure. For example, in a mixture of 1 mol of ethyl chloride, 3 mols of steam, and 1 mol of oxygen under a total pressure of 1 atmosphere, the ethyl chloride would have an absolute pressure of one-fifth of the total pressure, or roughly 6 inches of mercury absolute pressure. Equivalent to this 6 inches of mercury absolute pressure at atmospheric pressure would be ethyl chloride mixed with oxygen under a vacuum such that the partial pressure of the ethyl chloride is 6 inches of mercury absolute. The combination of a diluent such as nitrogen, together with the use of a vacuum, may be utilized to achieve the desired partial pressure of the organic compound. For the purpose of this invention, also equivalent to the 6 inches of mercury ethyl chloride absolute pressure at atmospheric pressure would be the same mixture of 1 mol of ethyl chloride, 3 mols of steam, and 1 mol of oxygen under a total pressure greater than atmospheric, for example, a total pressure of 20 p.s.i.a. Thus, when the total pressure in the reaction zone is greater than 1 atmosphere, the absolute values for the pressure of the organic compound to be dehydrogenated will be increased in direct proportion to the increase in total pressure above one atmosphere.

Preferably, the reaction mixture contains a quantity of steam, with the range generally being between about 2 and 40 mols of steam per mol of organic compound to be dehydrogenated. Preferably, steam will be present in an amount from about 3 to 35 mols per mol of organic compound to be dehydrogenated and excellent results have been obtained within the range of about 5 to about 30 mols of steam per mol of organic compound to be dehydrogenated. The functions of the steam are several-fold, and the steam may not merely act as a diluent. Diluents generally may be used in the same quantities as specified for the steam.

The gaseous reactants may be conducted through the reaction chamber at a fairly wide range of flow rates. The optimum flow rate will be dependent upon such variables as the temperature of reaction, pressure, particle size, and whether a fluid bed or fixed bed reactor is utilized. Desirable flow rates may be established by one skilled in the art. Generally, the flow rates will be within the range of about 0.10 to 25 liquid volumes of the organic compound to be dehydrogenated per volume of dehydrogenation zone containing catalyst per hour (referred to as LHSV), wherein the volumes of organic compound are calculated at standard conditions of 0° C. and 760 mm. of mercury. Usually, the LHSV will be between 0.15 and about 5 or 10. For calculation, the volume of reactor containing catalyst is that volume of reactor space including the volume displaced by the catalyst. For example, if a reactor has a particular volume of cubic feet of void space, when that void space is filled with catalyst particles, the original void space is the volume of reactor containing catalyst for the purpose of calculating the flow rate. The gaseous hourly space velocity (GHSV) is the volume of the organic compound to be dehydrogenated in the form of vapor calculated under standard conditions of 0° C. and 760 mm. of mercury per volume of reactor space containing catalyst per hour. Generally, the GHSV will be between about 25 and 6,400, and excellent results have been obtained between about 38 and 3,800. Suitable contact times are, for example, from about 0.001 or higher to about 4 or 10 or 25 seconds, with particularly good results being obtained between 0.01 and 5 seconds. The contact time is the calculated dwell time of the reaction mixture in the reaction zone, assuming the mols of product mixture are equivalent to the mols of feed mixture. For the purpose of calculation of contact times, the reaction zone is the portion of the reactor containing catalyst which is at a temperature of at least 250° C.

Catalyst binding agents or fillers may be used, but these will not ordinarily exceed about 50 percent or 60 percent by weight of the catalytic surface, and the described catalytic compositions will preferably constitute the main active constituent. These binding agents and fillers will preferably be essentially inert. Preferred catalysts are those that have as a catalytic surface exposed to the reaction gases at least 25 or preferably 50 weight percent of the defined catalytic surface. Also preferably iron will constitute at least 50 atomic weight percent of the cations in the catalytic surface. Suitable catalysts are those which do not contain sodium or potassium as an additive in the crystal structure, such as those containing less than 5 or less than 2 percent by weight of sodium or potassium based on the total weight of the catalyst. This is particularly true for processes that do not utilize halogen in the dehydrogenation zone.

The dehydrogenation reactor may be of the fixed bed or fluid bed type. Conventional reactors for the production of unsaturated organic compounds by dehydrogenation are satisfactory. Excellent results have been obtained by packing the reactor with catalyst particles as the method of introducing the catalytic surface. The catalytic surface may be introduced as such or it may be deposited on a carrier by methods known in the art such as by preparing an aqueous solution or dispersion of a catalytic material and mixing the carrier with the solution or dispersion until the active ingredients are coated on the carrier. If a carrier is utilized, very useful carriers are silicon carbide, aluminum oxide, pumice, and the like. Other known catalyst carriers may be employed. When carriers are used, the amount of catalyst on the carrier will suitably be between about 5 to 75 weight percent of the total weight of the active catalytic material plus carrier. Another method for introducing the required surface is to utilize as a reactor a small diameter tube wherein the tube wall is catalytic or is coated with catalytic material. Other methods may be utilized to introduce the catalytic surface such as by the use of rods, wires, mesh, or shreds, and the like, of catalytic material.

The catalysts of this invention comprise manganese ferrite produced in a particular manner. Manganese ferrite comprises a complex crystalline structure comprising manganese, iron and oxygen. According to this invention superior catalysts can be formed by producing the manganese ferrite by reacting by heating precipitates which are the precursors of manganese ferrite. The manganese and iron compounds may be separately precipitated and mixed prior to ferrite formation but the preferred method is to coprecipitate the manganese and iron compounds and form the ferrite by heating the coprecipitate to a temperature high enough to form the ferrite. This reaction to form the ferrite may be preceded by a drying operation or may be carried out by heating the precipitate in the reaction liquid. The heating to form the ferrite may also be partially or completely performed under conditions such as dehydrogenation in which case the ferrite formation is accomplished or completed in situ. Further, heating for ferrite formation is sometimes desirable in the presence of the compound to be dehydrogenated such as a hydrocarbon.

Any manganese ferrite precursor starting compounds may be used provided the precursors will form precipitates. The starting materials may be such as oxides, hydroxides, or salts including oxalates, acetates, formates, sulfates, nitrates, halides, hydrates and so forth. Suitable manganese compounds are such as manganese oxalate, manganese hydroxide, manganese nitrate, manganese carbonate, manganese salts of aliphatic monocarboxylic acids of one to five carbon atoms, manganese sulfates, salts of aliphatic alcohols of one to five carbon atoms, hydrates thereof and mixtures thereof. The same classes of iron compounds may be employed such as iron nitrate. The preferred class of manganese and iron compounds are the respective salts which are capable of forming precipitates and preferably those that will form precipitates from water. The inorganic salts give excellent results.

One procedure for forming the catalysts is to prepare an aqueous mixture of the precursor salts and thereafter this mixture can then be precipitated by mixing with a basic reactant to precipitate the precursor of the ferrite. Any suitable base may be employed but those containing unwanted cations will, of course, be less desirable. Volatile bases such as ammonium hydroxide or carbonate may be employed.

The temperature used for ferrite formation may be varied, depending somewhat upon the particular starting materials and upon the conditions present during ferrite formation. At any rate, superior catalysts are produced at temperatures of from high enough to form the ferrite to 1,000° C. or less. Still better catalysts are ordinarily produced at temperatures of less than 850° C. Suitable temperatures of reaction are such as between about 400° to 1,000° C., with a preferred range being from between about 500° to 800° C.

Another factor in producing superior catalysts is the rate of heating of the reactants to form the ferrite. Here again, the rate of heating will be dependent upon the particular reactants and conditions employed, but better results are generally obtained when the reactants are heated at a rate of no greater than about 250° C. per minute and still better results are ordinarily obtained when the rate is no greater than about 100° C. per minute.

Improved manganese ferrite compositions may be obtained by utilizing halogen or halogen compounds during the formation of the ferrite. The use of halogen or halogen compounds in this manner is claimed in a copending application by Philip M. Colling and Johnny C. Dean, Ser. No. 671,236, entitled "Oxidative Dehydrogenation of Organic Compounds," and filed on Sept. 28, 1967, now U.S. Pat. No. 3,567,793. An example of the use of a halogen would be the addition of manganese chloride to the reactants prior to the formation of the ferrite. Normally, chlorine is the preferred halogen so used.

The manganese ferrite compositions of this invention may also comprise additives. Phosphorus, silicon or mixtures thereof are examples of additives. For instance, phosphorus and/or silicon may suitably be present in an amount of from about 0.2 to 20 weight percent based on the total weight of the atoms of iron and manganese. These ingredients may contribute e.g., to the stability of the compositions. The silicon, phosphorus or other additives may be added at various stages of the preparation of the composition, or may be added to the already formed manganese ferrite. Any suitable compounds may be employed such as phosphoric acid, phosphorus pentoxide, ethyl phosphate, ammonium phosphate, silicon halides, etc.

The manganese ferrite composition may be reduced with a reducing gas prior to use in the process of dehydrogenation. Examples of reducing gases are hydrogen or hydrocarbons. For example, the manganese ferrite compositions may be reduced with, e.g., hydrogen at a temperature of at least 250° C. with the temperature of reduction generally being no greater than 850° C. By reducing gas is meant a gas that will react with oxygen under the conditions of reduction. However, it is one of the advantages of this invention that the manganese ferrites prepared according to this invention may not require reduction prior to use in the dehydrogenation reaction.

According to this invention it has been found that the preferred manganese ferrite compositions exhibit a certain type of X-ray diffraction pattern. The preferred compositions do not have as sharp X-ray diffraction reflection peaks as would be found, e.g., in a high crystalline material having the same chemical composition. Instead, the preferred catalysts of this invention exhibit reflection peaks which are relatively broad. The degree of sharpness of the reflection peak may be measured by the reflection peak band width at half weight ($W_{h/2}$). In other words, the width of the reflection peak as measured at one-half of the distance to the top of the peak is the "band width at half height." The band width at half height is measured in units of °2 theta. Techniques for measuring the band widths are discussed, e.g., in Chapter 9 of Klug and Alexander, X-ray Diffraction Procedures, John Wiley and Son, N.Y., 1954. The observed band widths at half height of the preferred catalysts of this invention are at least 0.16 °2 theta and normally will be at least 0.20 °2 theta.* (*The powder diffraction patterns may be made, e.g., with a Norelco constant potential diffraction unit type No. 12215/0 equipped with a wide range goniometer type No. 42273/0, cobalt tube type No. 32119, proportional counter type No. 57250/1; all coupled to the Norelco circuit panel type No. 12206/53. The cobalt K alpha radiation is supplied by operating the tube at a constant potential of 30 kilovolts and a current of 10 milliamperes. An iron filter is used to remove K beta radiation. The detector voltage is 1660 volts and the pulse height analyzer is set to accept pulses with amplitudes between 10 and 30 volts only. Slits used are divergence 1°, receiving 0.006 inches and scatter 1°. Strip chart recordings for identification are made with a scanning speed of one-fourth° per minute, time constant of 4 seconds and a full scale at $10^3$ counts per second. No correction is made for $K\alpha$ doublet or instrumental broadening of the band widths.) For instance, excellent oxidants have been made with band widths at half height of at least 0.22 or 0.23 °2 theta. The particular reflection peak used to measure the band width at one-half height is the reflection peak having Miller (hkl) indices of 220. (See, e.g., Chapter of Klug and Alexander, ibid). Applicant does not wish to be limited to any theory of the invention in regard to the relationship between activity and band width. The preferred catalysts will have as the most intense X-ray diffraction peak a peak within the range of 2.50 to 2.58, and more preferably another peak of from 1.47 to 1.53. The preferred compositions will have surfaces generally comprising X-ray diffraction reflection peaks at $d$-spacings within or about 4.87 to 4.93, 2.97 to 3.03, 2.53 to 2.59, 2.09 to 2.15, 1.70 to 1.76, 1.61 to 1.67 and 1.47 to 1.53, (with other peaks) with the most intense peak being between 2.52 to 2.59 and with the main active constituent $MnFe_2O_4$. Superior results have been obtained with compositions having peaks between 4.88 to 4.92, 2.98 to 3.03, 2.54 to 2.58, 2.10 to 2.14, 1.71 to 1.75, 1.62 to 1.66 and 1.48 to 1.52, with the most intense peak being between 2.54 to 2.58. These ranges will generally be within the $d$-spacings of 4.88 to 4.92, 2.99 to 3.01, 2.54 to 2.57, 2.10 to 2.14, 1.71 to 1.75, 1.63 to 1.65 and 1.49 to 1.51, with the most intense peak being within the range of 2.54 to 2.57.

In the following examples the conversions, selectivities and yields are reported in mol percent. Otherwise, all percentages are weight percent unless expressed to the contrary.

Example 1 is a comparative example where the catalyst is prepared by reacting iron oxide and manganese carbonate. Example 2 illustrates the process of this invention where the catalyst is prepared by heating a precipitate.

EXAMPLE 1

The manganese ferrite catalyst is prepared by reacting an intimate mixture of $\alpha$ $Fe_2O_3$ and $MnCO_3$ at 575° C. for 15 minutes. The atomic ratio of Fe to Mn in the catalyst is 1.6. The manganese ferrite composition is deposited on 7 to 8 mesh alumina carrier in an amount of 35 weight percent actives. The catalyst is not reduced for this test. The catalyst is evaluated in a fixed bed reactor at a ratio of 30 mols of steam and 0.7 mols of oxygen (as air) per mol of hydrocarbon. The liquid hourly space velocity is 1.5. The hydrocarbon feed is 88 mol percent 2-methylbutene-2 and 8 mol percent 2-methylbutene-1. At a maximum reactor temperature of 890° F. the conversion is 39 percent and the selectivity to isoprene is 88 percent for a molar percent yield of isoprene of 34 percent.

EXAMPLE 2

Example 1 is repeated with the exception that a catalyst prepared according to this invention is employed. The catalyst is prepared by coprecipitation of manganese and iron oxalate from an aqueous solution with the ratio of Fe to Mn being 1.6 as in the case of Example 1. The oxalates are precipitated with ammonium oxalate and the precipitate washed with distilled water. The precipitate is then dried at 100° C. for about 15 hours. The dried mixture of oxalate was heated in a muffle furnace at 300° C. until decomposition was complete and to form manganese ferrite. The catalyst is then coated on the carrier as in Example 1 and evaluated by the procedure of Example 1. As in the case of Example 1 the catalyst is not reduced. At a reactor temperature of 855° F., the conversion is 50 percent, the selectivity is 89 percent for a molar percent yield of isoprene of 44.5 percent per pass.

EXAMPLE 3

The reactor used consists of two 23 ½-inch electric multiple-unit, tube-type (hinged), combustion furnaces mounted vertically, one over the other, about 3 inches apart. Each of the two furnaces houses a 24-inch by 1-inch I.D. 316 S.S. tube. These two tubes are joined by a common connection located between the two furnaces. The top tube contains 6 × 6 mm Vycor* raschig rings and is used to vaporize, mix and preheat reactants and/or diluents before they pass, downflow, over the catalyst bed contained in the bottom tube of the reactor system. The bottom tube contains 125 cc of catalyst. Vycor raschig rings (6 × 6 mm) are used to support the catalyst at a desired level in the tube and, also, to fill any void space remaining in the tube above the level of the top of the catalyst bed. The temperature of the catalyst bed is measured with thermocouple inserted into a ¼-inch 316 s.s. thermowell located inside and coaxial with the reaction tube.

A manganese ferrite catalyst is prepared from 27.8 gms. of manganous sulfate, monohydrate and 84.8 gms of ferrous sulfate, heptahydrate. These sulfates are dissolved in 3 liters of boiling distilled water. To this solution is added 67 gms of ammonium oxalate monohydrate and 3.5 gms of oxalic acid dihydrate. Heating, with stirring, is continued for 15 minutes. The resulting co-precipitated oxalates (mixed crystals) are cooled to below 25° C., separated by decantation, washed with distilled water, filtered, dried at 100° C. and reacted in air at 300° C. for 2 hours to form the manganese ferrite. This manganese ferrite catalyst is ground twice in a hammer mill fitted with a 0.025-inch perforated screen before being deposited as 35 percent actives on 4–6 mesh alumina support (Carborundum Company type AMC).

Isoamylenes, air and steam are fed to the reactor at essentially atmospheric pressure. A feedstock containing 88 (mol) percent 2-methylbutene-2 plus 8 percent 2-methylbutene-1 is fed at a liquid hourly space velocity (LHSV) of 1.0 oxygen (as air) and steam are fed in a molar ratio of 0.8 mol and 30 mols, respectively, per mol of isoamylene. Conversion and selectivity of isoamylenes to isoprene at 415° is 49 and 90 (mol) percent, respectively. An X-ray diffraction pattern on this used catalyst reveals it to be manganese ferrite.

EXAMPLE 4

Example 3 is repeated for the dehydrogenation of isoamylenes to isoprene, with the exceptions that the steam to hydrocarbon ratio equals 30 to 1, the reaction temperature equals 410° C., the oxygen ratio is 0.7 and the LHSV is 1.5.

EXAMPLE 5

Example 3 is repeated except that the LHSV = 1.5; oxygen (as air)/steam/hydrocarbon ratios = 0.7/20/1.0. The selectivity of reaction products to isoprene is 90 percent.

EXAMPLE 6

Example 5 is repeated with the exception that the LHSV = 0.5. The selectivity to isoprene is 88 percent at a reaction temperature of 410° C.

EXAMPLE 7

Example 3 is repeated with the exception that a hydrocarbon composition of 75 percent butene-1 and 25 mol percent butane is employed as the feed to produce a product containing butadiene-1,3 and n-butene-1. The temperature of reaction is 455° C.

EXAMPLE 8

Example 3 is repeated to dehydrogenate ethyl benzene to styrene.

I claim:

1. A process for the vapor phase, oxidative dehydrogenation of an acyclic, aliphatic hydrocarbon of four to five carbon atoms, said hydrocarbon having at least one

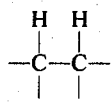

grouping, said process comprising contacting said hydrocarbon in the presence of a composition comprising manganese ferrite wherein the manganese ferrite is formed by heating precipitates of the precursors of manganese ferrites, said precipitates being formed by the coprecipitation of manganese and iron salts that form precipitates from water.

2. The method of claim 1 wherein the manganese is initially present as a compound selected from the group consisting of manganese oxalate, manganese hydroxide, manganese nitrate, manganese carbonate, manganese salts of aliphatic monocarboxylic acids of one to five carbon atoms, manganese sulfates, salts of aliphatic alcohols of one to five carbon atoms, hydrates thereof and mixtures thereof.

3. The method of claim 2 wherein the manganese in the reaction mixture is present as manganese oxalate and the iron is present as iron oxalate.

4. The method of claim 1 wherein the said hydrocarbon is selected from the group consisting of normal butene, methyl butene and mixtures thereof.

5. The method of claim 4 wherein the said hydrocarbon is methyl butene and the product is isoprene.

6. The method of claim 1 wherein the manganese ferrite is formed at a temperature of no greater than 1,000° C.

* * * * *